(12) United States Patent
Beyfuss et al.

(10) Patent No.: US 9,347,490 B2
(45) Date of Patent: May 24, 2016

(54) ROLLING BEARING CAGE

(75) Inventors: Berthold Beyfuss, Kaisten (DE);
Hans-Jürgen Friedrich,
Königsberg-Römershofen (DE); Alfred Radina, Poppenlauer (DE); Jonas Schierling, Hassfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 1788 days.

(21) Appl. No.: 12/741,151

(22) PCT Filed: Oct. 30, 2008

(86) PCT No.: PCT/EP2008/009163
§ 371 (c)(1),
(2), (4) Date: Sep. 8, 2010

(87) PCT Pub. No.: WO2009/056310
PCT Pub. Date: May 7, 2009

(65) Prior Publication Data
US 2010/0329599 A1    Dec. 30, 2010

(30) Foreign Application Priority Data
Nov. 2, 2007    (DE) .......................... 10 2007 052 507

(51) Int. Cl.
F16C 33/46    (2006.01)
F16C 19/24    (2006.01)
F16C 33/54    (2006.01)

(52) U.S. Cl.
CPC .............. F16C 33/4611 (2013.01); F16C 19/24 (2013.01); F16C 33/4664 (2013.01); F16C 33/548 (2013.01)

(58) Field of Classification Search
CPC ...... F16C 33/502; F16C 33/508; F16C 33/50; F16C 33/541–33/543; F16C 33/547; F16C 33/548; F16C 33/46; F16C 33/4641; F16C 33/4647; F16C 33/4652; F16C 33/4658; F16C 33/4664; F16C 33/4676; F16C 33/516; F16C 33/51; F16C 33/6681; F16C 33/6629; F16C 19/225; F16C 19/305; F16C 19/463
USPC ......... 384/576–580, 572–574, 470, 523, 524, 384/527, 530, 531, 614, 623; 29/898.065, 29/898.067
See application file for complete search history.

(56) References Cited

U.S. PATENT DOCUMENTS 1,147,497 A    7/1915  Freed
1,147,498 A    7/1915  Freeman
(Continued)

FOREIGN PATENT DOCUMENTS

DE    356545 C    7/1922
DE    821447 C    9/1952
(Continued)

OTHER PUBLICATIONS

EPO Translation of the Description of DE 102006045436 A, Schroeder, Mar. 27, 2008.*

*Primary Examiner* — Daniel Yabut
(74) *Attorney, Agent, or Firm* — Bryan Peckjian; SKF USA Inc. Patent Dept.

(57) ABSTRACT

A roller bearing cage includes the following features:
The cage comprises an annular circumferential element, from which bridge elements branch off, roller bodies of the roller bearing being disposable between the bridge elements,
the circumferential element comprises a plurality of uniform section elements, and
the initially-loose section elements and bridge elements are connected with each other to form the cage.

27 Claims, 7 Drawing Sheets

(56) References Cited

U.S. PATENT DOCUMENTS

| | | | | |
|---|---|---|---|---|
| 1,149,889 A | * | 8/1915 | Beemer | 384/560 |
| 1,611,976 A | | 12/1926 | Williford | |
| 2,946,633 A | * | 7/1960 | Gothberg | 384/576 |
| 3,075,278 A | * | 1/1963 | Bratt | 384/579 |
| 3,087,762 A | * | 4/1963 | Gothberg | 384/578 |
| 3,256,585 A | * | 6/1966 | Ripple | 384/579 |
| 3,284,146 A | * | 11/1966 | Ripple | 384/578 |
| 3,365,255 A | * | 1/1968 | Altson | 384/578 |
| 3,685,114 A | * | 8/1972 | Vannest | 29/898.067 |
| 4,054,340 A | * | 10/1977 | Broshkevitch et al. | 384/576 |
| 4,834,227 A | * | 5/1989 | Lederman | 384/572 |
| 4,934,841 A | * | 6/1990 | De Vito | F16C 33/6681 384/572 |
| 5,285,950 A | * | 2/1994 | Zlotek | 29/898.065 |
| 5,516,215 A | * | 5/1996 | Bergmann | F16C 23/086 384/448 |
| 5,626,426 A | * | 5/1997 | Honda et al. | 384/568 |
| 5,651,438 A | * | 7/1997 | Papania | 384/578 |
| 2002/0081053 A1 | | 6/2002 | van der Knokke | |
| 2007/0248297 A1 | * | 10/2007 | Shorr et al. | 384/577 |

FOREIGN PATENT DOCUMENTS

| | | | |
|---|---|---|---|
| DE | 874683 C | 4/1953 | |
| DE | 940732 C | 3/1956 | |
| DE | 1039315 B | 9/1958 | |
| DE | 1575505 A1 | 1/1970 | |
| DE | 7432281 U | 1/1975 | |
| DE | 7935982 U1 | 6/1980 | |
| DE | 4227662 A1 | 2/1994 | |
| DE | 19839486 A1 | 3/2000 | |
| DE | 20020397 U1 | 2/2001 | |
| DE | 10065169 A1 | 7/2002 | |
| DE | 102004003655 A1 | 8/2005 | |
| DE | 102005049666 A1 | 4/2007 | |
| DE | 102006045436 A1 * | 3/2008 | F16C 33/502 |
| FR | 486498 A | 4/1918 | |
| GB | 1154797 A | 6/1969 | |
| GB | 1296976 A | 11/1972 | |
| JP | 6117440 A | 2/1992 | |
| JP | 6117440 A | 4/1994 | |
| JP | 2003139142 A | 5/2003 | |
| WO | WO2008131924 A1 | 11/2008 | |

* cited by examiner

ROLLING BEARING CAGE

CROSS-REFERENCE

This application is the U.S. national stage filing of International Application No. PCT/EP2008/009163 filed Oct. 30, 2008, which claims priority to German patent application no. 10 2007 052 507.0 filed Nov. 2, 2007.

TECHNICAL FIELD

The invention concerns a roller bearing cage.

RELATED ART

A roller bearing cage is known, e.g., from DE 79 35 982 U1, which is comprised of two side parts and a plurality of bridge parts that are separately manufactured and connected with the side parts by welding or the like, wherein the bridge parts form pockets between them for accommodating the roller bodies. The side parts and bridge parts are manufactured from flat or profile-milled wire and the bridge parts are stamped to form the slip surfaces for the roller bodies.

SUMMARY

It is an object of the present invention to provide an improved roller bearing cage that is, in particular, producible in a simple and thus cost-effective manner.

In one aspect of the present teachings, a roller bearing cage includes the following features:
- an annular circumferential element, from which bridge elements branch off, roller bodies of the roller bearing being disposable between the bridge elements,
- the circumferential element comprises a plurality of uniform section elements, and
- the initially-loose section elements and bridge elements are connected with each other to form the cage.

Consequently, the section elements are advantageously producible, e.g., in a simple and cost-effective manner by cutting an appropriately-profiled bar or strip material, preferably made of steel, into sections. Relative to roller bearing cages that are machined from a hollow cylinder-like pipe, the roller bearing cage according to the present invention naturally also offers the advantage that no material waste results from a machining, in particular, of the cage pockets, and thus a material savings advantageously results relative to such a method.

In an advantageous embodiment, the bridge elements are formed so as to be uniform, so that they are also producible in a simple and cost-effective manner by cutting an appropriately-profiled bar or strip material, preferably made of steel, into sections.

In another aspect of the present teachings, snap-fit possibilities for the roller bodies are realizable for a cage made from steel, as have been otherwise known only for brass and/or plastic cages, wherein such a design is possible irrespective of whether it concerns a composite cage or a cage produced from one piece, e.g., a steel pipe segment.

In an advantageous embodiment, the circumferential element on the one hand and the bridge elements on the other hand are formed with different properties. In this case, it is advantageously possible to pair different materials and, e.g., to produce less heavily-loaded elements from cheaper materials depending on the application. Further, it is also possible to form one of the elements from a heat-treated steel for a high wear resistance and to leave other elements untreated, e.g., for a high ductility.

In a further advantageous embodiment, it is possible form at least one of the elements in a coated manner. In this case, due to the formation of the roller bearing cage from circumferential and bridge elements, it is much simpler and thus also more cost-effective to perform the coating of individual elements, e.g., the bridge elements. The same applies to a further advantageous embodiment, in which droplet-shaped impressions are provided on the surfaces of the bridge elements that face the roller bodies and function as lubrication pockets. In one embodiment, the lubrication pockets can be disposed in a left axial half of the bridge element oblique relative to a line extending obliquely from the right roller bearing area to the roller bearing middle point and can be formed in the right half in a correspondingly mirrored manner.

Further advantages, features and details of the invention are derivable from the exemplary embodiments described in the following with the assistance of the Figures.

DETAILED DESCRIPTION OF THE INVENTION

Figure 1:
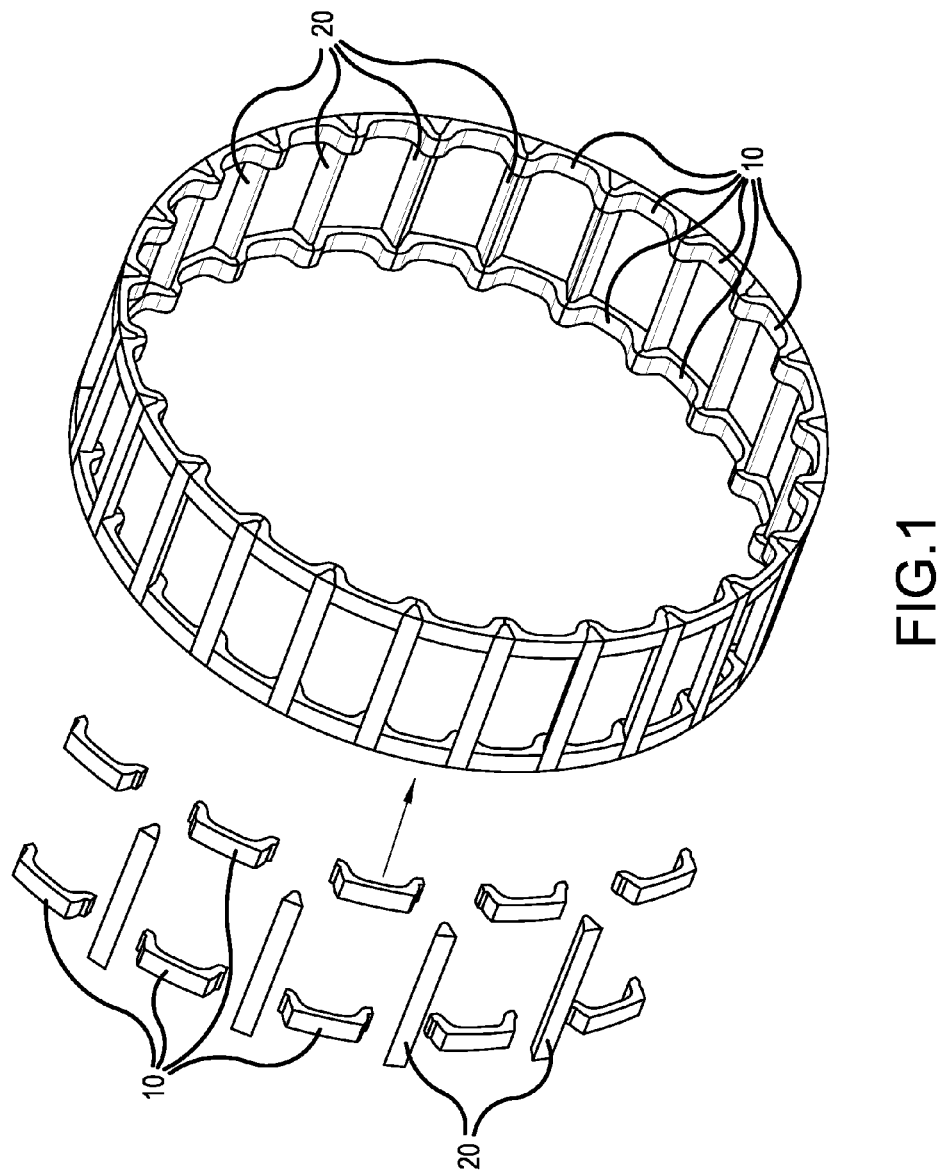
FIG. 1 shows in perspective view a cylindrical roller bearing cage composed of elements.

As an exemplary embodiment of the invention, FIG. 1 shows a cylindrical roller bearing cage composed of elements 10 and 20. The cylindrical roller bearing cage comprises an annular circumferential element on each of its two axial ends and a plurality of bridge elements 20 connecting the two circumferential elements with each other. The left portion of FIG. 1 shows in an exploded view that the two annular circumferential elements are formed by a plurality of uniform section elements 10 that are assembled together into the annular circumferential elements. Thus, the section elements 10 are produced in a simple and cost-effective manner by cutting an appropriately-profiled bar or strip material made of steel into sections.

The bridge elements 20 are also produced in a simple and cost-effective manner by a cutting an appropriately-profiled bar or strip material made of steel into sections. In particular, the side surfaces of the bridge elements 20, which are provided for lying opposite of the outer surfaces of the cylindrical rollers, are formed in a curved-manner corresponding to the roller outer surface, which advantageously improves the formation of the lubricating film.

The connection points of the section elements 10 are formed such that a V-shaped inward bulge or recess results in the radial direction at the connection point, into which bulge or recess the axial ends of the bridge elements 20 are inserted in a fitted manner, so that the positions of the bridge elements 20 on the circumferential elements are predetermined in the circumferential direction. In general, the connection points are formed such that each radially-outward-facing recess is V-shaped, U-shaped or trapezoid-shaped with straight, convex or concave legs of the V-, U- or trapezoid shape. The individual elements 10 and 20 are then connected with each other in a fusion-bonded manner, e.g., by welding. This welding can take place, e.g., according to a laser-, electron- or plasma-method. In other embodiments, the elements 10 and 20 can also be soldered with each other, e.g., by an inductive hard soldering or laser hard soldering, or can also be adhered with each other.

Thus, each of the section elements 10 in the areas, in which it is connected with the two adjacent section elements 10, forms a potential slip surface for a roller end side that is disposed radially further inward relative to the remaining end surface of the section element 10, so that a potential slip surface extending as far radially as possible results in the radial direction as viewed for the roller end sides, which advantageously provides a supplemental tilting prevention system for the cylindrical rollers. This larger radial extension at least in areas of the circumferential element is advantageously achievable with the cage composed of elements 10 and 20 irrespective of the radial thickness of the bridge elements 20. Thus, a comparatively large connection surface for the axial ends of the bridge elements 20 to the section elements 10 is also advantageously achievable.

In the cylindrical roller bearing cage of FIG. 1, the individual elements 10 and 20 can initially be connected with each other and then the cage can be assembled by inserting rollers into the corresponding cylindrical roller bearing. However, it is also possible, in particular in connection with a track element having rims on both ends of the cylindrical roller end sides, to dispose the elements 10 and 20 around the rollers laid in said track element and then to connect, so that the track element forms a captive unit with the cylindrical rollers and the cage.

On the other hand, construction of the elements 10 and 20 from other materials, e.g., other metallic alloys as well as also plastic, and their production by sintering and/or injection molding, is also possible in other implementations. Further, a conical roller bearing cage can also be formed in a manner comparable to the above-described cylindrical roller bearing, wherein in this case the two circumferential elements differ solely in their diameter and thus two types of section elements are to be provided.

Due to the fact that the cage of FIG. 1 has a substantially smooth outer surface, it is usable, in particular, e.g., as a cage that is shoulder-guided on a correspondingly-formed outer track element. In this case, the bridge elements 20 are, with particular advantage, supplementally so-to-speak mechanically secured on the radially outward side by the shoulder of the outer track element, while the bridge elements 20 are retained on the radially inward side by the circumferential elements composed of the section elements 10.

Figure 2A:
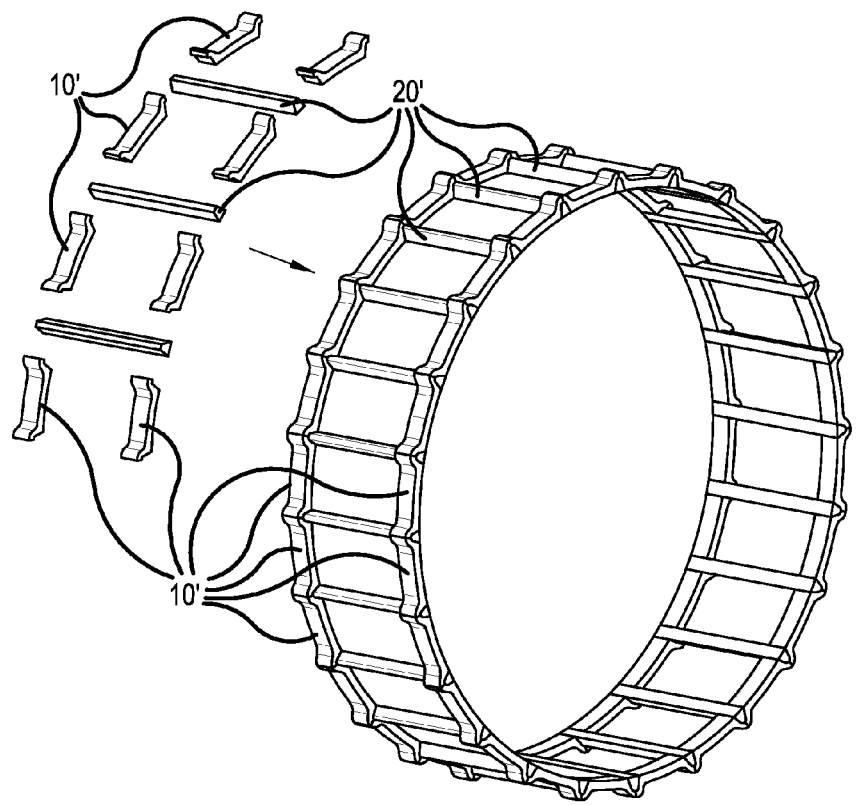
FIG. 2A shows in perspective view a further cylindrical roller bearing cage composed of elements.

For producing a corresponding cage that is shoulder-guided on a correspondingly-formed inner track, different section elements merely have to be utilized, as is illustrated in FIG. 2A. In this case, the bridge elements 20' are now secured on the radially inward side by the at least one shoulder of the inner track element and are retained on the radially outward side by the circumferential elements composed of the section elements 10'. In FIG. 2A, the cylindrical roller bearing cage composed of the section elements 10' and the bridge elements 20' now has a substantially smooth inner surface.

Figure 2B:
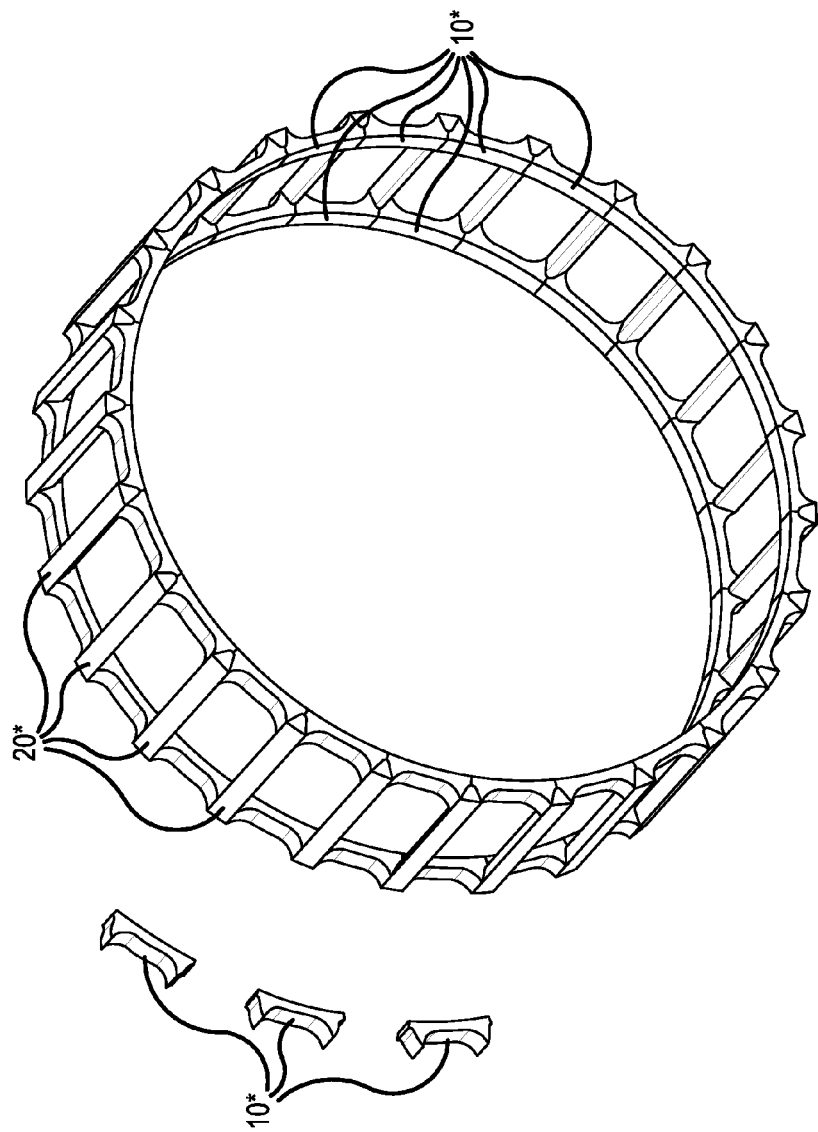
FIG. 2B shows in perspective view a further cylindrical roller bearing cage composed of elements.

As a further exemplary embodiment of the invention, FIG. 2B shows a cylindrical roller bearing cage composed of section elements 10\* and bridge elements 20\* that differs from the cage of FIG. 2A, in essence, in that the bridge elements 20\* are retained on the radially outward side merely by their fusion-bonded connection with the section elements 10\*, which can be completely sufficient depending upon the application. Otherwise, the preceding description for FIGS. 2A and 2B applies in a corresponding manner. In other embodiments, instead of a pure inner- or outer shoulder-guidance, the cages can be formed for a combined inner- and outer guidance, pure roller guidance, other guidance types such as track guidance and/or combinations thereof.

Figure 3:
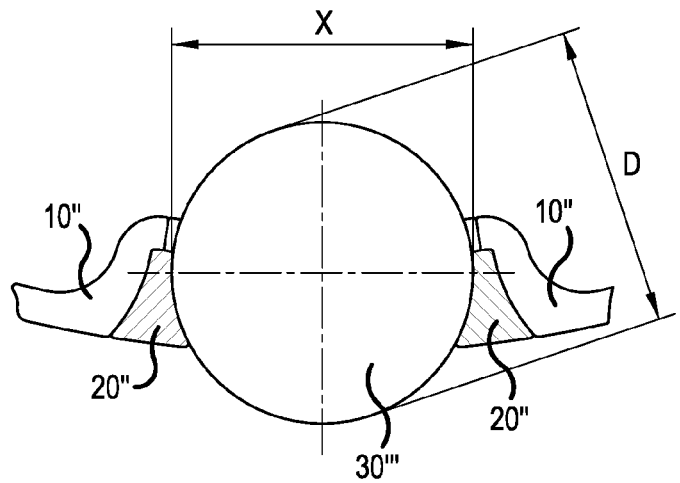
FIG. 3 shows a cross-section through a pocket of a cage similar to the cage of FIG. 1 having a snap-fit functionality for the roller bodies due to a special spacing of bridge elements.

As a further exemplary embodiment of the invention, FIG. 3 shows a cross-section through a pocket of a cage similar to the cage of FIG. 1. In this case, the cage of FIG. 3 is formed such that the bridge elements 20" defining the pocket have an opening width X relative to each other that is approximately 3/10 mm smaller than the diameter D of the cylindrical roller 30". As a result, the cylindrical rollers 30" can be snap-fit into the cage composed of the section elements 10" and bridge elements 20", wherein the cage with the rollers 30" snap-fit therein represents a captive transport unit, but the rollers 30" are also removable again by a simple snapping-out. As a result, it is possible, with particular advantage, to produce said snap-fit function by using steel material for the elements. Otherwise, the preceding description applies in a corresponding manner.

Figure 4:
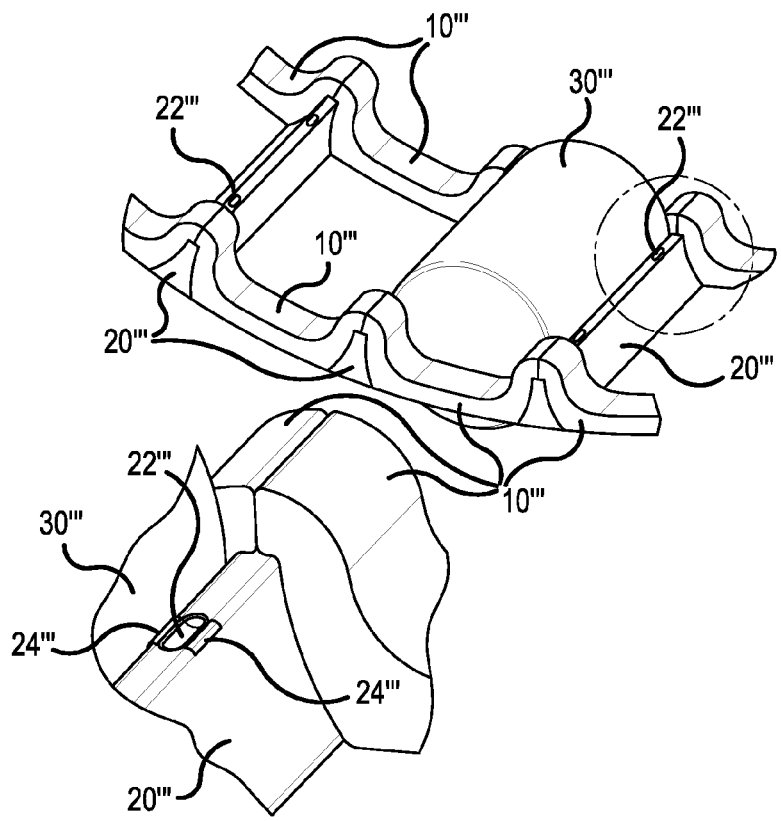
FIG. 4 shows in perspective view a circumferential segment of a cage similar to the cage of FIG. 1 having a snap-fit functionality for the roller bodies due to a special construction of the bridge elements.

As a further exemplary embodiment of the invention, FIG. 4 shows in perspective view pockets of a cage similar to the cage of FIG. 1 for realizing a snap-fit possibility for cylindrical rollers 30". For this purpose, impressions 22''' are introduced in the radial direction on the narrow, radially-inward side surfaces of the bridge elements 20''' at two points along its axial extension, so that nib-like outward bulges 24''' result in the circumferential direction on both sides of the impressions 22''', which produce the snap-fit function for the cylindrical rollers 30'''. The lower part of FIG. 4 shows a cut-out enlargement of the area indicated with a circle in the upper part of FIG. 4. Otherwise, the preceding description applies in a corresponding manner.

Figure 5:
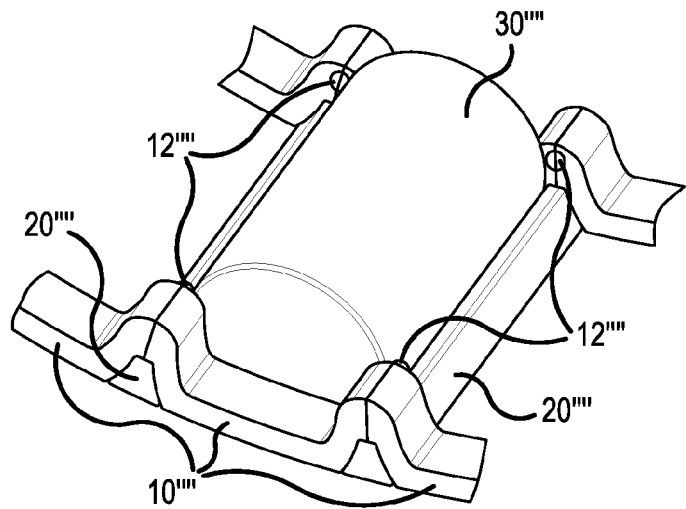
FIG. 5 shows in perspective view a pocket of a cage similar to the cage of FIG. 1 having a snap-fit functionality for the roller bodies due to nibs on the circumferential elements.

As a further exemplary embodiment of the invention, FIG. 5 shows in perspective view a U-shaped pocket of a cage similar to the cage of FIG. 1 defined by adjacent bridge elements 20'''' at both end sides of the annular circumferential element 10'''' with cylindrical rollers 30'''' inserted therein. For realizing a snap-fit function for the cylinder rollers 30'''' in the pocket, axially-inwardly-projecting, cylinder-like nibs 12'''' are provided at the inwardly-oriented end sides of adjacent section elements 10'''' in their connection area. Otherwise, the preceding description applies in a corresponding manner.

Figure 6:
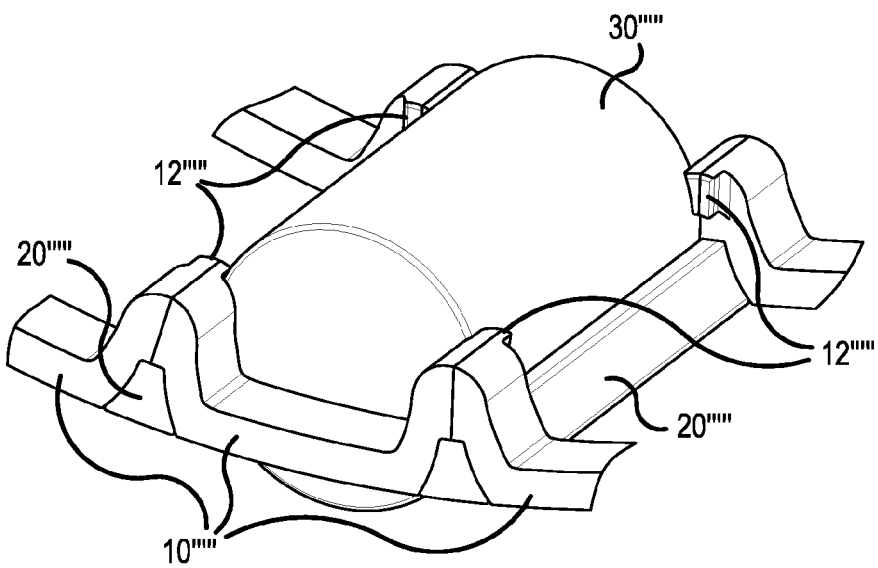
FIG. 6 shows in perspective view a pocket of a cage similar to the cage of FIG. 1 having a retaining function for the roller bodies due to nibs on the circumferential elements.

As a further exemplary embodiment of the invention, FIG. 6 shows in perspective view a pocket of a cage similar to the cage of FIG. 1 with cylinder rollers 30''''' inserted therein. Similar to FIG. 5, nibs 12''''' are provided in FIG. 6 that have, however, a geometry adapted to the cylinder roller shape in a suitable manner. In particular in the embodiments of FIGS. 5 and 6, the nibs 12"" and 12"" can also be formed such that a snap-in and a snap-out of the cylinder rollers 30"" and 30"" is not possible any longer, so that a connection of the section elements 10"" or 10"", respectively, and bridge elements 20"" or 20"", respectively, with cylinder rollers 30"" or 30"", respectively, inserted therein takes place.

Figure 7:
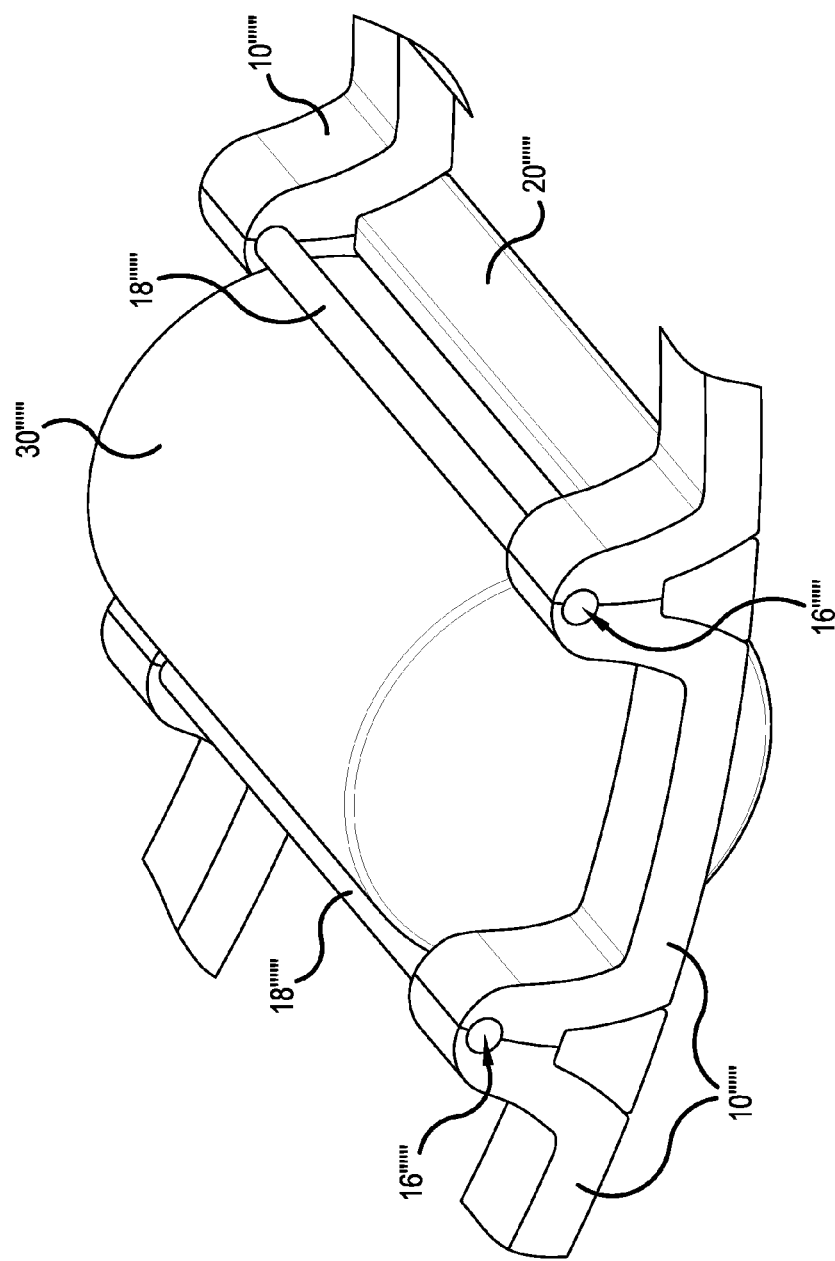
FIG. 7 shows in perspective view a pocket of a cage similar to the cage of FIG. 1 having pins parallel to the bridge elements.

As a further exemplary embodiment of the invention, FIG. 7 shows in perspective view a cage similar to the cage of FIG. 1 with cylinder rollers 30""" inserted therein. The connection areas of the section elements 10""" are formed such the adjacent section elements 10""" form axial through-holes 16""". After inserting the cylinder rollers 30""" into the cage pocket, pins 18""" are pushed through the axial through-holes 16""" and affixed, so that another guiding surface for the cylinder roller surface results for the cylinder rollers 30""" inserted in the pocket and thus counteracts a twisting of the cylinder rollers 30""" with particular advantage.

Figure 8:
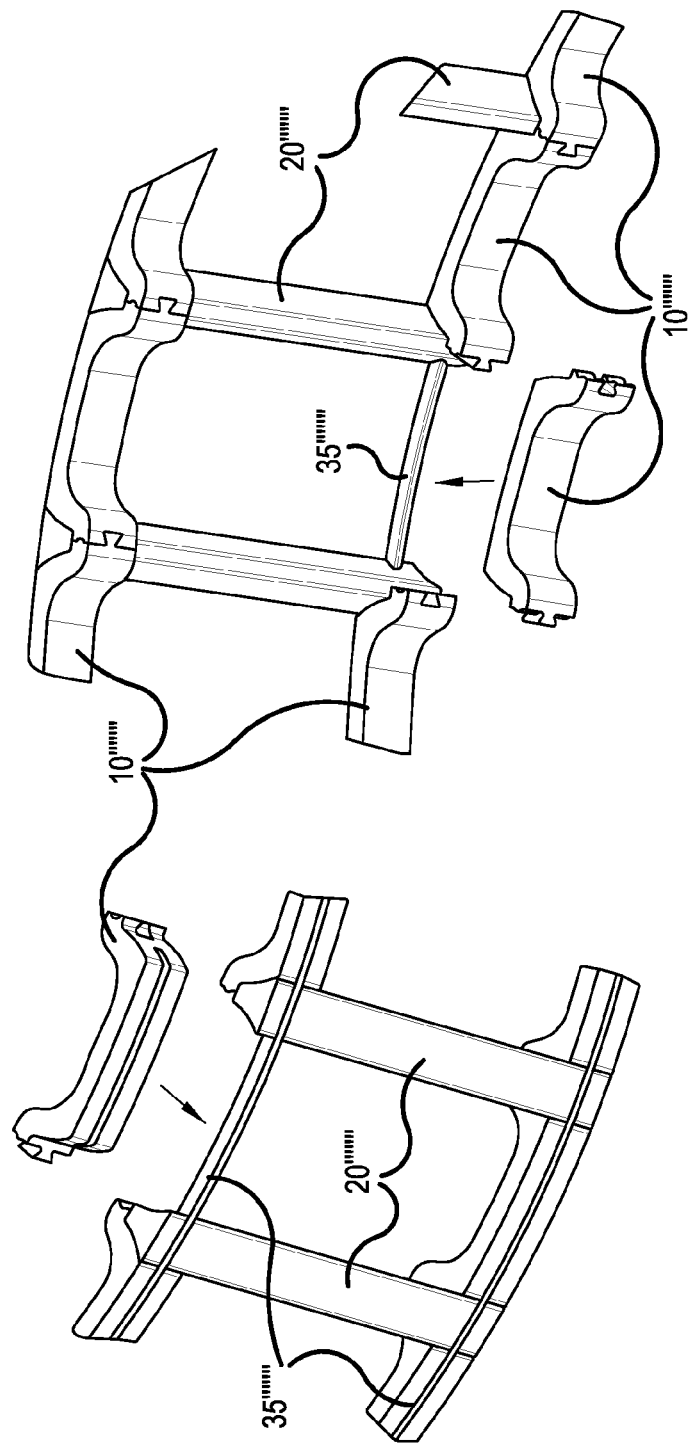
FIG. 8 shows in perspective view and in two opposite observation directions a pocket of a cylindrical roller bearing cage composed of elements, in which the elements are held together by snap-rings.

As a further exemplary embodiment of the invention, FIG. 8 shows in perspective view and in two opposing observation directions a pocket of a cage composed of bridge elements 20"""" and section elements 10"""". Different from the preceding exemplary embodiments, the elements 10"""" and 20"""" in this cage are not connected with each other in a fusion-bonded manner, but rather are held together by two snap rings 35"""" that are in-laid in an interference-fit in corresponding grooves formed on the elements 10"""" and 20"""". Further, the section elements 10"""" are formed so as to be clippable together. Such a cage is simple to assemble with particular advantage, but can also again be disassembled. In other embodiments, other annular retaining elements can naturally be utilized instead of snap rings 35"""".

The invention claimed is:

1. A roller bearing cage for a roller bearing including:
at least one annular circumferential element having an interior and an exterior and comprised of at least first, second and third discrete, uniform section elements each of the at least first, second and third section elements having a first end and a second end circumferentially spaced from the first end, and
a plurality of discrete bridge elements including a first bridge element and a second bridge element, each of the plurality of discrete bridge elements having a first end and a second end and extending tangentially relative to the at least one annular circumferential element, roller bodies being disposable between respective adjacent bridge elements of said plurality of bridge elements,
wherein the second end of the first section element is connected to the first end of the second section element at a first seam, the second end of the second section element is connected to the first end of the third section element at a second seam and the first end of the first bridge element radially overlies the first seam and lies entirely on the exterior of the at least one annular circumferential element or entirely in the interior of the at least one annular circumferential element.

2. The roller bearing cage according to claim 1, wherein the section elements and bridge elements are welded together.

3. The roller bearing cage according to claim 1, wherein the section elements are formed such that a radially-outward-facing recess is defined at each connection point between two adjacent section elements of the section elements, wherein respective axial ends of the bridge elements are respectively disposed in the radially-outward-facing recesses.

4. The roller bearing cage according to claim 3, wherein each radially-outward-facing recess is V-shaped, U-shaped or trapezoid-shaped with straight, convex or concave legs of the V-, U- or trapezoid shape.

5. The roller bearing cage according to claim 1, wherein the cage is formed for a snap-fit of the roller bodies in the cage such that a spacing between the first bridge element and the second bridge element is between about 0.1-0.9 mm smaller than a diameter of the roller body.

6. The roller bearing cage according to claim 1, wherein the bridge elements include projections extending in the circumferential direction at least up to a roller body disposed between two adjacent bridge elements, the projections being configured to retain the roller body in a snap-fit.

7. The roller body cage according to claim 1, wherein a projection extending at least in an axial direction is defined at each connection area of two adjacent section elements of the section elements, adjacent projections of said projections being configured to respectively retain roller bodies in a snap-fit.

8. The roller bearing cage according to claim 7, wherein the projections comprise nibs extending from first and second ends of each of the at least three discrete uniform section elements, wherein all parts of each nib are spaced from the bridge elements.

9. The roller bearing cage according to claim 1, wherein a through-hole is defined at a connection area of the first section element and the second section element, and a pin is inserted through the through-hole, the pin extending approximately parallel to the first bridge element.

10. A The roller bearing cage according to claim 1, wherein a surface of at least one segment of at least one of the bridge elements has a trapezoid shape in cross-section.

11. The roller bearing cage according to claim 10, wherein two sides of the trapezoid are curved conforming to the roller bodies.

12. The roller bearing cage according to claim 1, wherein the at least one annular circumferential element includes one annular circumferential element disposed at each of the two axial ends of the bridge elements.

13. The roller bearing cage according to claim 1, wherein pockets are respectively defined at least by a U-shape and formed by adjacent bridge elements, the pockets being aligned at both end sides of the annular circumferential element.

14. The roller bearing cage according to claim 1, wherein at least one lubricant-retaining recess is defined in a surface of at least one of the bridge elements.

15. The roller bearing cage according to claim 1, wherein the at least one annular circumferential element has different material properties than the bridge elements.

16. The roller bearing cage according to claim 1, wherein the section elements and/or the bridge elements is/are at least partially coated.

17. The roller bearing cage according to claim 1, wherein the roller bearing cage is configured for a cylindrical or self-aligning roller bearing.

18. The roller bearing cage according to claim 1, wherein a circumferentially-extending groove is defined in the at least one annular circumferential element and wherein an annular retaining element is disposed in the circumferentially-extending groove and retains the section elements and the bridge elements together.

19. The roller bearing cage according to claim 18, wherein the section elements are snap-fit together.

20. The roller bearing cage according to claim 1, wherein a projection extending at least in an axial direction is defined at each connection area of two adjacent section elements of the section elements, adjacent projections of said projections being configured to respectively retain roller bodies in a snap-fit.

21. A roller bearing cage for a roller bearing including:
an axis of rotation;
at least one annular circumferential element comprising at least first, second and third discrete, uniform section elements, each of the first, second and third section elements comprising a body having a first end and a second end and a first leg extending from the first end and a second leg extending from the second end;
a plurality of discrete bridge elements including a first bridge element and a second bridge element, each of the plurality of discrete bridge elements comprising first and second longitudinally spaced ends and extending in an axial direction, roller bodies being disposable between respective adjacent bridge elements of said plurality of bridge elements,
wherein the second leg of the first section element is connected to the first leg of the second section element at a first seam, the second leg of the second section element is connected to the first leg of the third section element at a second seam and the first end of the first bridge element is connected between the body of the first section element and the body of the second section element at a third seam,
wherein the at least one annular circumferential element comprises first and second axially spaced circumferential elements,
wherein each of the first and second legs of each of the first, second and third section elements includes a projection at a distal end, the projections being configured to retain a roller body in a snap-fit manner in a pocket defined in the circumferential direction between two circumferentially-adjacent bridge elements and in the axial direction between two axially-adjacent section elements, and
wherein the projection at the distal end of the second leg of the first section element directly contacts the projection at the distal end of the first leg of the second section element.

22. The roller bearing cage according to claim 21, wherein the first end of the first bridge element is connected between the second leg of the first section element and the first leg of the second section element.

23. The roller bearing cage according to claim 21, wherein each of the first and second legs of the first, second and third section elements extends from the body of the respective first, second and third section elements at an obtuse angle
wherein each of the first legs of the first, second and third section elements includes a foot projecting from an end of the each of the first legs at third obtuse angle and each of the second legs of the first, second and third section elements includes a foot projecting from an end of the each of the first, second an third elements at a fourth obtuse angle,
wherein the foot of the second leg of the first section element is connected to the foot of the first leg of the second section element at the first seam.

24. The roller bearing cage according to claim 23, wherein the first bridge is connected to the foot of the second leg of the first section element and connected to the foot of the first leg of the second section element.

25. The roller bearing cage according to claim 21, wherein the first and second legs of each of the first, second and third section element project toward an interior of the cage.

26. The roller bearing cage according to claim 21, wherein the first and second legs of each of the first, second and third section element project away from an interior of the cage.

27. The roller bearing cage according to claim 21, wherein the at least one annular circumferential element has an interior and an exterior and wherein each of the plurality of discrete bridge elements lies entirely in the interior of the at least one annular circumferential element or lies entirely on the exterior of the at least one annular circumferential element.

* * * * *